Dec. 15, 1970  S. F. LEMANSKI  3,546,980
TOOL MEANS FOR CUTTING CIRCLES AND THE LIKE
Filed May 29, 1968  2 Sheets-Sheet 1
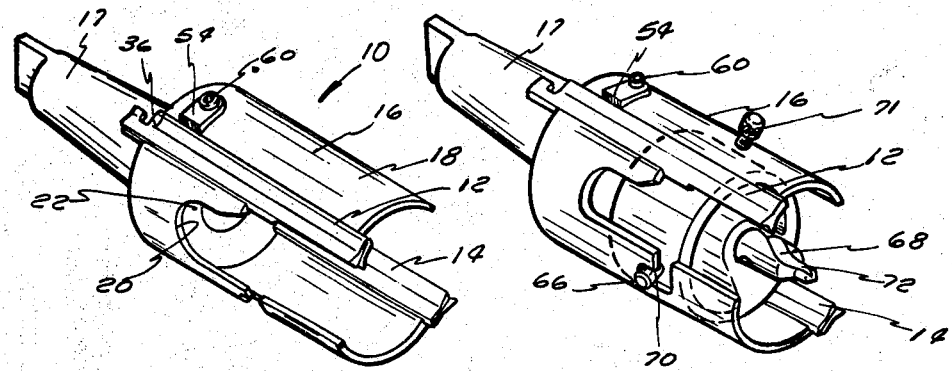
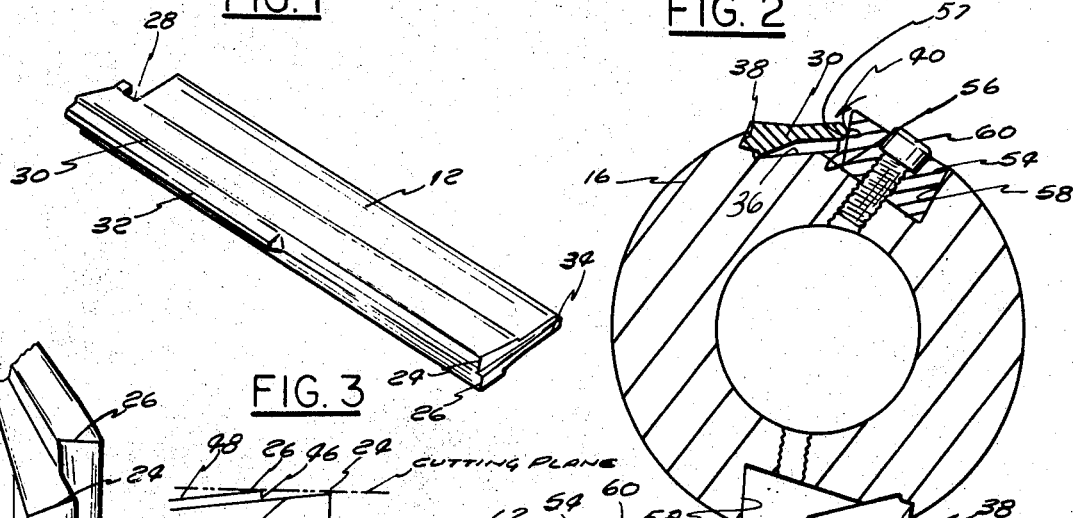
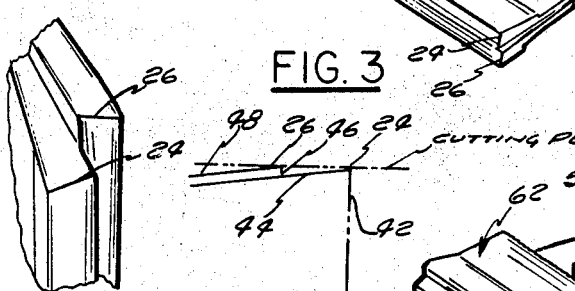
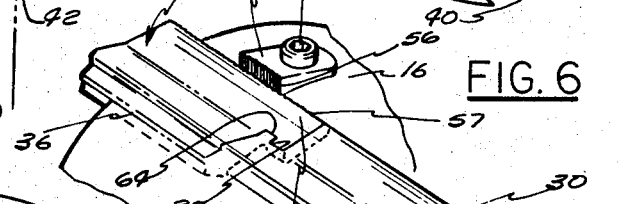
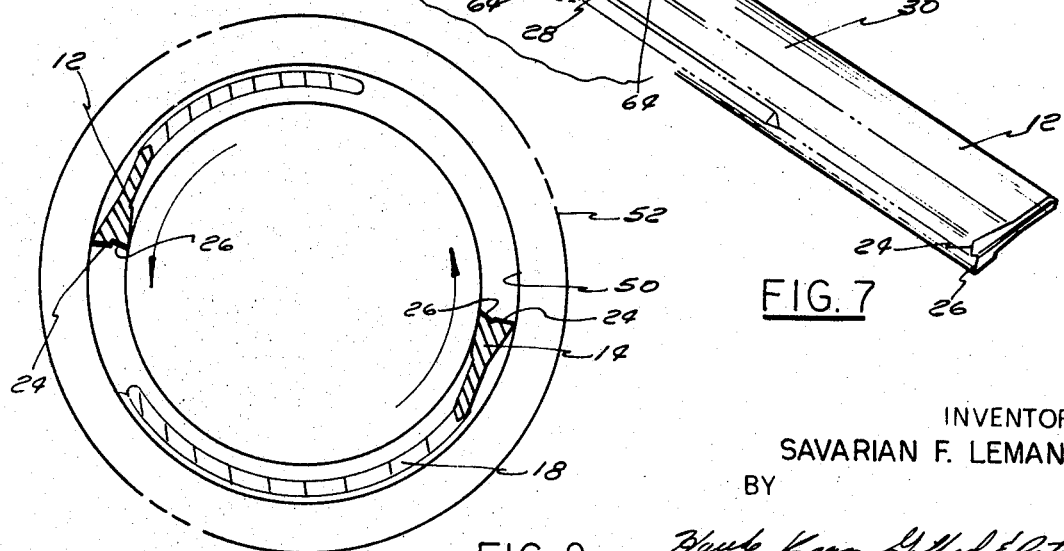
INVENTOR.
SAVARIAN F. LEMANSKI
BY
ATTORNEYS

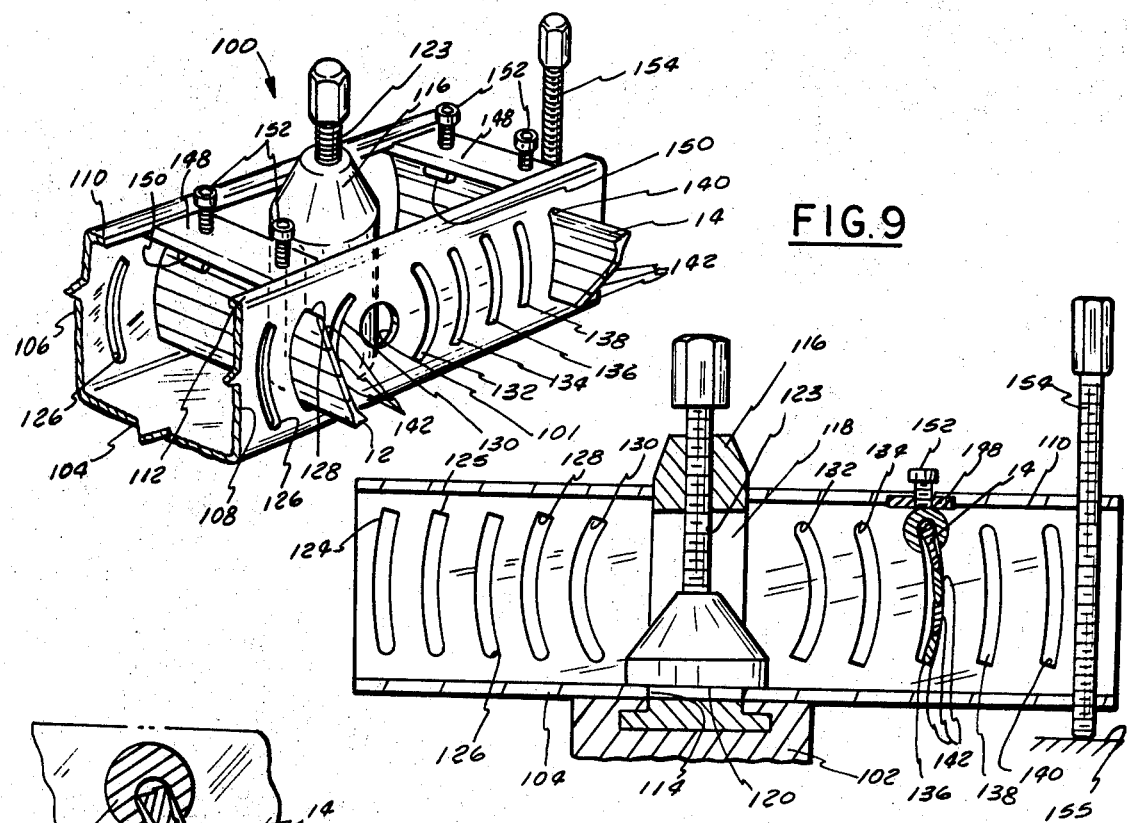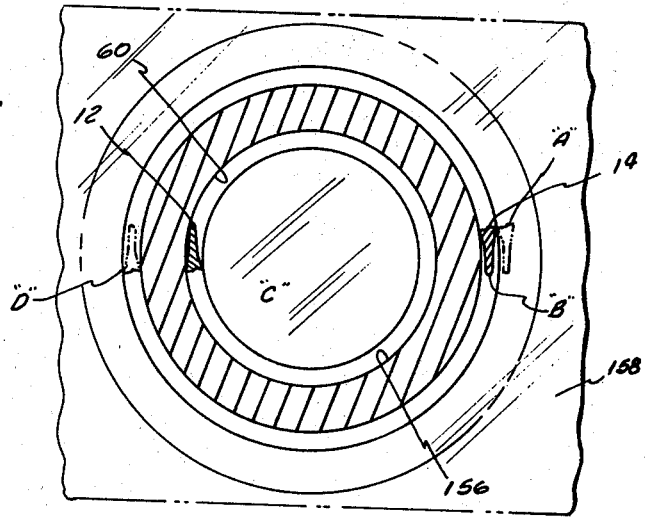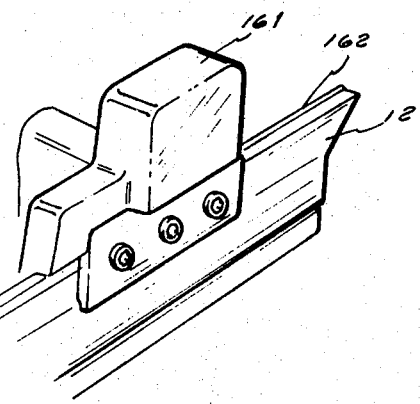

United States Patent Office 3,546,980
Patented Dec. 15, 1970

3,546,980
TOOL MEANS FOR CUTTING CIRCLES
AND THE LIKE
Savarian F. Lemanski, Detroit, Mich.
(2148 Collins Ave., Utica, Mich. 48087)
Filed May 29, 1968, Ser. No. 733,074
Int. Cl. B23b 51/04
U.S. Cl. 77—79
6 Claims

ABSTRACT OF THE DISCLOSURE

Tool means for cutting circular or ring-shaped elements from a workpiece in which a pair of cutting tools, mounted in a holder, are engaged with the workpiece and then relative rotation is produced between the tool holder and the workpiece. A tool having cutting edges in a novel configuration, a pair of tool holders having novel means for mounting the tools, and a novel means for clamping the tools on the holder are disclosed.

BACKGROUND OF THE INVENTION

Field of the invention

This invention relates to tools for cutting circular or ring-shaped elements from a workpiece, and more specifically to a novel tool means in which a pair of cutting tools, mounted in a holder, are engaged with the workpiece and then relative rotation is produced between the tool holder and the workpiece in such a manner that the cutting edges of the tools cut a circular path in the workpiece.

Description of the prior art

Various tools have been disclosed in the prior art for cutting disks or circular elements from a workpiece, or for cutting a hole in a workpiece. Such tools generally include two or more cutting elements supported symmetrically with respect to an axis of rotation, and rotated with respect to the workpiece as cutting elements are advanced toward the workpiece. Examples of such tools are to be found in Pat. Nos. 170,527; 808,031; 1,765,799 and others.

SUMMARY OF THE INVENTION

One of the objects of the present invention is to provide a novel cutting tool which may be employed to cut a circular path in a workpiece, a hole in a relatively thick workpiece, a disk, or other similar operations. The preferred cutting tool is elongated and formed of a hardened tool steel and has a shank on one end and cutting edges formed on an opposite end. The tool has a generally flat cross section which tapers from a leading edge toward a trailing edge. There are two, generally straight cutting edges integrally ground on the cutting end of the tool. The two cutting edges are generally parallel with one of the cutting edges being formed in the leading edge of the tool and the second cutting edge is formed rearwardly of the leading edge. The forward cutting edge extends half the thickness of the tool and the rearward cutting edge extends the remainder of the thickness so that their combined lengths equal the full cutting thickness of the tool. Both cutting edges are formed in a plane which is transverse to the longitudinal axis of the tool so that when mounted in their holder they both penetrate the workpiece to an equal depth.

The advantage of integrally forming two separated edges on the tool which cut to the same depth is that the shaving is split into two curls so that it cannot load up in front of the tool as occurs with a tool having a single cutting edge. In addition, the tool is easy to grind and the shape of the tool allows its longitudinal, leading edge to be employed as a cutting edge.

In one embodiment of the invention, the preferred cutting tool is mounted in pairs on opposite sides on a tool holder having a generally cylindrical tool-supporting section with a shank on one end. The cylindrical section has a pair of axial slots extending between its opposite longitudinal ends with each tool being mounted in a slot so its cutting edges extend slightly beyond one of the free ends of the cylindrical section. The wall of the cylindrical section has a thickness that is less than the total width of the cutting path formed by the two cutting edges of each tool when the holder is rotated about its longitudinal axis. Thus the trailing edge of each tool is in abutment with and backed up by the wall substantially along its full length. The cylindrical section of the holder is also adapted to support a pilot drill which can be mounted to stabilize the holder during the initial cutting motion of the tools until they have penetrated the workpiece.

The preferred apparatus employs a novel clamping means for mounting the tool on the holder. The clamping means includes a clamping member which is mounted on one side of the tool-supporting slot with a serrated clamping surface facing the opposite side of the slot and in abutment with the trailing edge of the tool. The clamping member is held in position by a screw which when tightened cams the clamping member toward the opposite side of the slot so that the shank of the tool is rigidly clamped between the clamping member and the opposite side of the slot.

The cutting edges of the preferred tool are re-ground as they become worn. Since each re-grinding shortens the overall length of the tool, an adapter is employed when the tool is too short to be clamped by its shank and still have its cutting end in a cutting position. The end of the adapter inter-engages with the shank end of the tool so that the adapter forms an extension of the shank. By clamping the adapter to the holder instead of the tool, the shortened tool can be mounted with its cutting end in a cutting position beyond the end of the holder thereby prolonging its useful life.

Another preferred holder has a box-like shape that is rigidly clamped to a supporting surface such as the bed of a lathe and the workpiece rotated and advanced toward the holder. In this form of the invention, the tool holder has a pair of spaced parallel supporting walls, each formed with aligned arcuate slots formed about a central hole which is aligned with the axis of rotation of the workpiece which corresponds with the tailstock of the lathe.

Each cutting tool and a series of inter-engaging, elongated backing plates are mounted in a pair of aligned slots in the two supporting walls with the cutting edges of the tools extending beyond one of the supporting walls toward the workpiece. The slots are formed in the holder about the axis of the alignment hole with each pair of aligned slots having a different radius from any other pair. The curvature of each pair of slots corresponds with the circular cutting path that is to be formed in the workpiece when the cutting tool is disposed in the particular set of slots. In this manner, a pair of cutting tools, each disposed in slots of different radii, will cut a pair of concentric circular grooves in the workpiece. If the radius of one of the cutting tools is only slightly greater than the radius of the other cutting tool so that their cutting paths overlap, the two tools can be set up to cut a single substantially wide groove.

The two cutting tools may be mounted to cut separate, but concentric circular grooves. A ring-shaped element is formed when both tools penetrate through the workpiece.

One novel feature of this latter holder is that all the mounting slots have the same overall length. The trailing longitudinal edge of the tool and the longitudinal edges of each backing plate are provided with tongue-and-groove means so that when disposed in side-edge to side-edge abutment in any of the slots they assume the curvature of the particular slot in which they are disposed. Each backing plate has a thickness which is less than the thickness of its tool so that as the tool penetrates the workpiece the backing plates can enter the formed groove with the tool and support the tool substantially its full length against tangential cutting forces.

Still other advantages of the present invention will readily occur to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a perspective view of a preferred tool holder in which a pair of preferred cutting tools are mounted;

FIG. 2 is a perspective view of the tool holder of FIG. 1 on which a pilot drill is mounted together with a pair of the preferred cutting tools;

FIG. 3 is a perspective view of the preferred cutting tool separated from its holder;

FIG. 4 is an enlarged, fragmentary perspective view of the cutting end of the tool;

FIG. 5 is a view of the cutting end of the tool showing the relationship between the two cutting edges;

FIG. 6 is an enlarged cross-sectional view through the tool holder of FIG. 1 showing the manner in which one of the cutting tools is clamped in its slot;

FIG. 7 is a perspective view showing the manner in which the adapter is employed with a shortened tool;

FIG. 8 is a view showing the disposition of the cutting tools as they form a circular cutting path in a workpiece;

FIG. 9 is a perspective view showing another embodiment of the invention;

FIG. 10 is an enlarged cross-sectional view through the tool holder of FIG. 9 showing the manner in which the holder is clamped onto a supporting surface;

FIG. 11 is an enlarged fragmentary view showing the manner in which each cutting tool and its associated backing plates are mounted on the holder of FIG. 9;

FIG. 12 is a view showing the relative disposition of a pair of cutting tools in the holder of FIG. 9 arranged to cut a ring-shaped element from a workpiece; and FIG. 13 is a fragmentary view in perspective showing the prepared tool mounted so that its longitudinal edge is in a cutting position.

DESCRIPTION OF THE PREFERRED EMBODIMENTS

Now referring to FIG. 1, the preferred cutting apparatus is generally indicated at 10 as comprising a pair of cutting tools 12 and 14 mounted on a tool holder 16. The holder 16 has a shank 17. The cutting tools 12 and 14 are similar to one another and arranged on diametrically opposite sides of a cylindrical supporting section 18 so that when the holder 16 is rotated about the axis of the cylindrical section 18, the cutting tools 12 and 14 tend to equalize the cutting forces as they engage a workpiece.

The cylindrical section 18 of the holder has a wall thickness that is less than the thickness or cutting width of the tools 12 and 14 and has a cutout portion as at 20 in front of the leading edge of each tool for the shavings which are cut from the workpiece as the holder 16 is rotated in a counterclockwise direction as viewed in FIG. 1. Each of the tools 12 and 14 are elongated and mounted on the holder 16 such that their cutting edges project slightly beyond the end of the cylindrical section 18. Thus the cylindrical wall of the holder backs up substantially the full length of each cutting tool against tangential cutting forces. It is to be noted that because the cylindrical section 18 has a relatively thin wall, the tools can penetrate into a workpiece to a depth which corresponds to the length of the cylindrical section that projects beyond a mounting bushing 22 carried at the shank end of the holder.

Now as best seen in FIG. 3, the preferred cutting tool 12 is elongated and has a pair of cutting edges 24 and 26 formed on one end, and a notched portion 28 formed in its shank end. The tool has a shank portion 30 and a longitudinal V-shaped tongue 32 along its leading edge. The entire trailing edge of the tool has a generally V-shaped tongue 34 so that the tool 12 can be mounted in an axial slot 36 formed in the cylindrical section 18 of the holder with the two V-shaped tongues 32 and 34 slidably interfitting with a pair of V-shaped grooves 38 and 40 formed in the sides of the slot 36.

Referring to FIGS. 3, 4, and 5, the cutting edges 24 and 26 on the cutting end of the tool 12 are each straight, spaced from one another with their inner ends slightly rearward of their outer ends. The forward cutting edge 24 is defined by the intersection of a face 42 on the leading edge of the tool and an end face 44 that forms an acute cutting angle for the edge 24. Similarly, the trailing cutting edge 26 is formed by the intersection of a longitudinal face 46 that is parallel to the face 42, and an end face 48 that is parallel to the end face 44.

Both of the cutting edges 24 and 26 are integrally formed on the end of the tool 12 in a plane that is transverse to the longitudinal axis of the tool. Thus when the tool is advanced into the workpiece in a direction parallel to the axis of the holder, both cutting edges 24 and 26 penetrate the workpiece to an equal depth. As the cutting edges 24 and 26 advance into the workpiece, the leading cutting edge 24 which extends half the thickness of the tool from one side, forms one-half the width of the cutting path in the workpiece, and the trailing cutting edge 26, which extends half the thickness of the tool from its opposite side forms the remainder of the width of the cutting path in the workpiece. The two cutting edges cut a split shaving which curls in front of the tool and allows a much wider groove to be cut in a workpiece than can be cut by a tool having a single edge producing a single width shaving.

The width of the tool behind the cutting edges 24 and 26 tapers toward the trailing edge so that there is no interference between the tool and the groove which the tool forms in the workpiece. This relationship is best shown in FIG. 8 in which the tools 12 and 14 are shown as cutting a path 50 in a workpiece 52. This view shows how the trailing portions of the cutting tool, as well as the backup portions of the cylindrical section 18 of the holder, advance into the cutting path 50 with the workpiece without interferring with the sides of the groove that is cut.

Now referring to FIG. 6, each cutting tool is clamped in its respective slot by a clamping member 54 that is mounted on the holder 16 adjacent one side of each of the slots 36. The clamping member 54 has a serrated clamping surface 56 facing the opposite side of the slot and in abutment with a notched side edge 57 of the shank 30. The clamping member 54 is seated in a socket 58 formed in the holder and retained by a screw 60. The screw 60 is mounted so that when tightened, the line of contact on the clamping surface 56 in abutment with the side edge 57 of the tool is cammed toward the opposite side of the slot 36 so that the tool is tightly clamped between the clamping member 54 and the side 38 of the slot 36. This arrangement permits the cutting tool to be easily mounted in or separated from its respective slot.

Referring to FIG. 7, as the cutting end of the tool 12 is re-ground to re-form the cutting edges 24 and 26, the overall length of the tool becomes reduced so that eventually there is an insufficient length to permit the clamping member 54 to engage the shank end of the tool while permitting the cutting end of the tool to project beyond the cylindrical section 18 of the holder. When this occurs an elongated adapter 62 is employed which has a lug 64 on its end for interlocking the notched shank end 28 of the tool. The adapter 62 has a cross section which is similar to the tool 12 so that it can be slidably disposed in the slot 36 of the holder. The adapter 62 forms an extension of the tool and allows the cutting edges of the shortened tool to be mounted in a cutting position beyond the end of the holder 16. This allows the end of the tool 12 to be reground until the full length of the tool beyond the shank 30 has been consumed.

Referring to FIG. 2, the holder 16 has a pair of sockets 66 (only one of which is shown) for seating a pilot drill means 68 having a pair of pins 70 (only one of which is shown) which seat in the sockets 66. The pilot drill means 68 is locked in position by a locking screw 71 and has a drill element 72 mounted so as to extend slightly beyond the cutting ends of the tools 12 and 14. In certain types of work, the drill means 68 provides means for initially stabilizing the holder 16 until the tools 12 and 14 have formed a cutting path in the workpiece. When the tools have penetrated the workpiece, the drill means 68 is removed from the holder 60.

FIGS. 9 to 12 show another holder generally indicated at 100 for mounting the cutting tools 12 and 14 in order to cut a circular path in a workpiece. The holder 100 is intended to be held stationary on a support 102 with the workpiece being rotated about an axis that coincides with the axis of an alignment hole 101 in the holder as the workpiece is advanced toward the cutting edges of the tools 12 and 14. The tool holder 100 includes a box-like support having a base 104, and a pair of spaced parallel sidewalls 106 and 108 which terminate upwardly in a pair of inwardly directed lips 110 and 112. The holder is mounted on the support 102 by lowering an opening 114 in the base over a spindle 116 having a slot 118 in which a clamping member 120 is inserted. The clamping member 120 is clamped down on the base 104 by a clamping screw 123 so that the holder is rigidly mounted on the support 102.

The walls 106 and 108 have a series of pairs of aligned slots 124, 125, 126, 128, 130, 132, 134, 136, 138 and 140 which are formed concentrically about the axis of the alignment hole 101. Each of the slots has a curvature with a radius which corresponds to its distance from the alignment hole 101 so that the curvature of each pair of slots varies from that of other slots which are formed at a different distance. The pairs of slots 130 and 132, 128 and 134, 126 and 136, 125 and 138, and 124 and 140 each have a similar curvature.

In FIGS. 9 and 11, the cutting tool 14 is shown as mounted in the slot 140 together with three similarly shaped backing plates 142. The cutting tool 12 is similarly mounted in the slot 128 with three similarly formed backing plates 142. Each of the backing plates 142 is elongated with a generally flat cross section with a V-shaped groove 144, along its forward longitudinal edge and a generally rounded trailing edge 146 which interfits with the V-shaped groove of the adjacent backing plate.

The tool 14 and its three backing plates 142 have a combined width which substantially corresponds to the common overall length of each of the slots. When mounted in any of the slots the forward edge of the tool 14 is adjacent the upper end of the slot and the trailing edge of the bottom backing plate 142 abuts the lower end of the slot. It can be seen that the V-shaped groove 144 and the rounded longitudinal edges 146 of each backing plate allows the tool and its associated set of backing plates to be mounted in a slot having any curvature with the backing plates tending to assume the curvature of the slot. Because the backing plates are thinner than the cutting width of their tool, they can advance with the cutting tool into the circular groove cut in the workpiece. This arrangement allows the tool to be supported substantially its full length up to its cutting end against tangential cutting forces.

The particular slot in which each tool and its backing plates 142 are disposed depends on the radius of the circle that is to be cut in the workpiece. By providing a cutting tool and a set of backing plates which can be mounted in any of the slots, the cutting apparatus can be quickly and easily set up using a minimum number of components.

Each cutting tool and its respective set of backing plates are rigidly clamped in place by a flat clamping member 148 which spans the underside of the lips 110 and 112 of the tool holder, a pair of retainer members 150 which engage the upper longitudinal edge of the cutting tool, and a pair of clamping screws 152 which are threadably mounted on the clamping member 148. As the screws 152 are tightened, they urge the retainer members 150 downwardly so that the cutting tool and its associated backing plates are clamped against the bottom end of the two aligned slots in which they are mounted.

An elongated threaded member 154 is also threadably engaged with the base 104 of the tool holder with its lower end bearing against a suitable bearing surface 155 so that it stabilizes the tool holder against turning forces when the workpiece is engaged with the cutting tools.

The cutting tools 12 and 14 can be mounted in the mounting slots in a variety of configurations. In one configuration, with closely adjacent slots (not shown) the cutting tools can be mounted as at "A" and "B" in FIG. 12 so that as a workpiece 158 is rotated the tool at "A" mounted on the outer radius will cut a groove in the workpiece 158 having the width of the two cutting edges of the tool and the second cutting tool at "B" will form an inner groove which slightly overlaps the outer groove so that the two cutting tools cooperate in forming a final groove which is greater than the cutting width of either tool. This arrangement allows the operator to form a relatively wide circular cutting path in the workpiece 158.

In another configuration, as can be seen in FIG. 12, the cutting tools 12 and 14 can be mounted in slots as at "B" and "C," the slots having radii such that the cutting tool 14 cuts an outer circular path 156 in the workpiece 158 which is separated from an inner circular path 160 cut by the cutting tool 12. When both tools have penetrated completely through the workpiece, a ring-shaped element is formed.

In still another arrangement, the tools 12 and 14 can be mounted as at "B" and "D" with each tool cutting in the same groove. FIG. 13 illustrates still another holder 161 for mounting the tool 12 in which the leading edge 162 of the tool is in a cutting position. Thus the tool 12 has two cutting edges 24 and 26 and a third cutting edge 162 along its longitudinal edge.

In summary, it is to be understood that I have described in detail a novel double-edged cutting tool that can be employed in a circle cutting apparatus. I have also described a pair of tool holders in which the tool can be mounted in pairs, including the holder 16 which is normally rotated with respect to the workpiece and the tool holder 100 in which the workpiece is rotated with respect to the tool holder. I have also described a novel clamping means for mounting the tool in the tool holder 16 and a novel adapter 62 which forms an extension of the tool in order to permit a greater portion of the tool to be consumed. I have also described a novel set of flexible backing elements 142 which allows the tool to be mounted in any one of a set of mounting slots, each having a different curvature.

Although I have described several embodiments of my invention, it is to be understood that various changes and revisions can be made therein without departing from the spirit of the invention as expressed in the scope of the appended claims.

I claim:
1. A cutting means comprising:
   (a) a holder;
   (b) an elongated cutting tool having integral first and second generally straight cutting edges formed in a pair of substantially parallel, spaced lines extending across the width of the tool on an end of said tool in a plane which is perpendicular to the longitudinal axis of said tool; each of said cutting edges extending only a portion of said cutting width, and said tool having a pair of sides spaced by said cutting width, said first of said cutting edges extending from one of said sides toward the second of said sides approximately half the thickness of the tool between said sides; and said second of said cutting edges extending from said second of said sides towards the first of said sides the remainder of the thickness of said tool, such that said first and second cutting edges are in an end to end relationship; and (c) means for mounting the tool on said holder for cutting engagement with a workpiece upon relative movement between the holder and the workpiece in a direction perpendicular to said cutting width, so that said first and second cutting edges cut the workpiece to a common depth with one of the cutting edges forming a partial width cut in the workpiece and the second cutting edge forming the remainder of the width of the cut in the workpiece.

2. In a cutting apparatus wherein a workpiece and a tool holder are moved relatively toward one another along an axis of rotation and relative rotation produced between said workpiece and said tool about said axis, the combination of a pair of cutting tools and means for mounting a first of said cutting tools on the holder at an inner-radius with respect to said axis of rotation, and the second of said cutting tools at an outer radius with respect to said axis of rotation, said outer radius being greater than said inner radius, so that when said cutting tools are engaged with the workpiece said first and second cutting tools produce separated circular cutting paths in said workpiece so that penetration of both of said tools through said workpiece forms an annular element; said tools being elongated with cutting edges formed on one end thereof, and including a set of elongated backing plates mounted in abutment behind each of said tools, and each set of elongated backing plates being operative to support its associated tool against motion with respect to the tool holder caused by cutting forces.

3. The invention as defined in claim 2, wherein the means for mounting said tools and said backing plates comprise a pair of arcuate slots in said holder, each of said slots being formed at a different radius about a common axis, and having a similar length, and wherein each of said tools and its associated set of backing plates have inter-fitting edge formations adapted to permit each tool and its backing plates to be disposed in either of said slots with the tool adjacent one end of the slot and the rearwardmost backing plate in abutment with the opposite end of the slot and the backing plates generally assuming the curvature of the slot.

4. The invention as defined in claim 3, wherein the slots are formed in the holder on opposite sides of said common axis.

5. The invention as defined in claim 2, wherein each of said backing plates has a thickness slightly less than the cutting path produced by its associated cutting tool so that the backing plates can advance with the tool into a groove cut by the cutting tool as the tool penetrates the workpiece.

6. The invention as defined in claim 2, wherein each of said backing plates is elongated and substantially flat with a groove formed along one longitudinal edge and a tongue along its opposite longitudinal edge, the tongue being engageable with the groove of a similarly formed backing plate so that each set of backing plates can be disposed in a curved slot with the plates in abutment with one another and generally assuming the curvature of the slot.

References Cited
UNITED STATES PATENTS

| | | | |
|---|---|---|---|
| 2,475,668 | 7/1949 | Krist | 77—79 |
| 1,145,822 | 7/1915 | Wilder | 77—69 |
| 313,405 | 3/1885 | Davis | 77—69 |

OTHER REFERENCES

Publication: American Machinist, p. 185, Feb. 2, 1922, article entitled "Easing the Pressure on a Cutting-Off Tool," by Clarence B. Coe.

FRANCIS S. HUSAR, Primary Examiner

U.S. Cl. X.R.

145—121

PO-1050
(5/69)

UNITED STATES PATENT OFFICE
CERTIFICATE OF CORRECTION

Patent No. 3,546,980            Dated December 15, 1970

Inventor(s) Savarian F. Lemanski

It is certified that error appears in the above-identified patent and that said Letters Patent are hereby corrected as shown below:

IN THE HEADING:

Column 1, line 5, delete "2148 Collins Ave., Utica, Mich. 48087" and substitute --109 Taylor Ave., Detroit Mich. 48202-- as shown in the Declaration, line 3, filed with the application.

Signed and sealed this 18th day of May 1971.

(SEAL)
Attest:

EDWARD M. FLETCHER, JR.        WILLIAM E. SCHUYLER, JR.
Attesting Officer                Commissioner of Patents